United States Patent Office 2,923,028
Patented Feb. 2, 1960

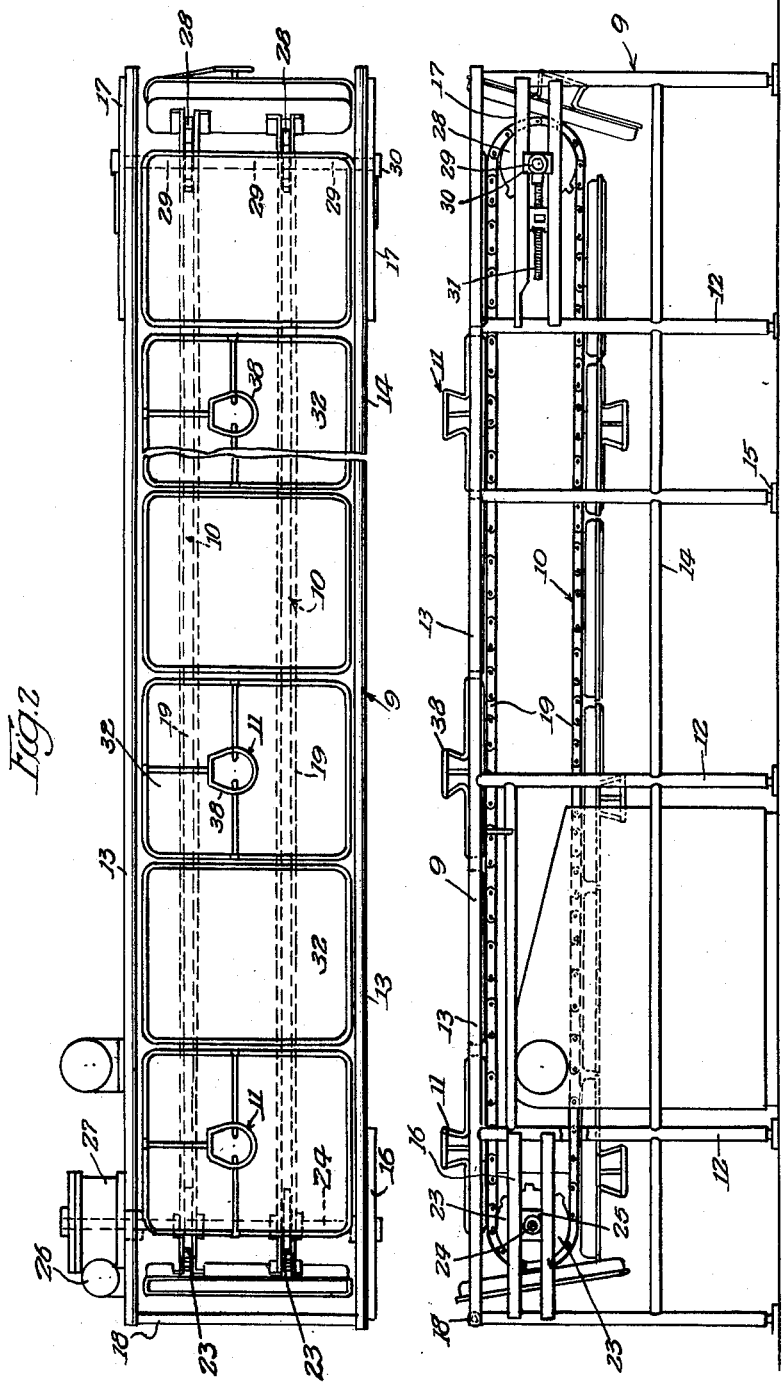

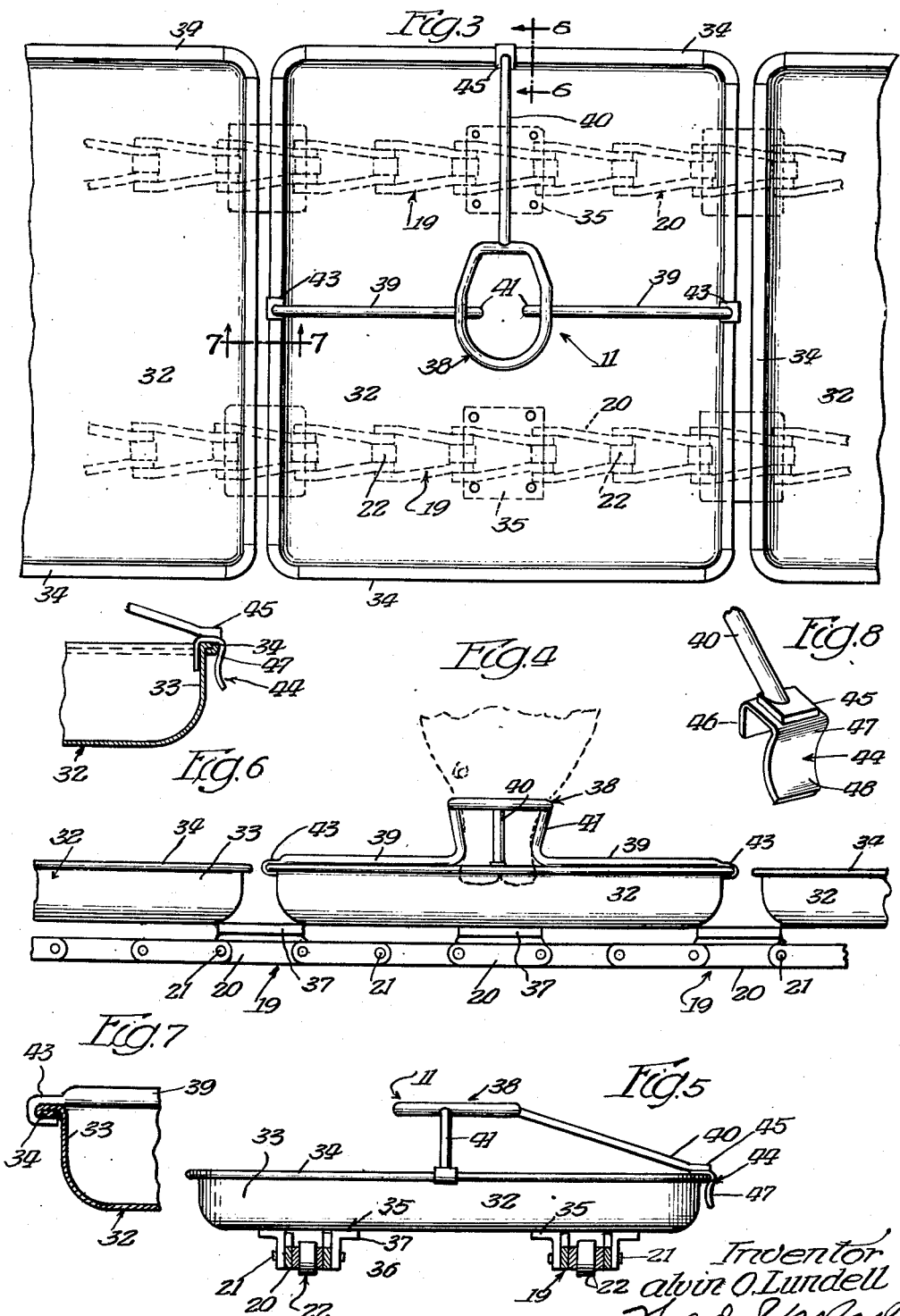

2,923,028

INSPECTION APPARATUS FOR THE VISCERA AND HEADS OF ANIMAL CARCASSES

Alvin O. Lundell, Chicago, Ill., assignor to The Allbright-Nell Company, Chicago, Ill., a corporation of Illinois Application August 30, 1954, Serial No. 453,046

5 Claims. (Cl. 17—24)

The present invention relates generally to apparatus for use in connection with the inspection of the viscera and heads of certain animal carcasses. More particularly, the invention relates to that type of inspection apparatus which is of the so-called moving top variety and comprises an elongated frame structure with pairs of vertically extending sprocket wheels at its ends and power operated mechanism for driving one pair of sprocket wheels, a pair of parallel spaced apart endless chains extending around the sprocket wheels and having upper and lower horizontal reaches, and a continuous series of flat rectangular rim-equipped pans which extend between, and are connected to, the two chains.

In commercial slaughtering and packing houses, it is standard practice to inspect the viscera and the heads of hog, sheep and calf carcasses and to employ an inspection apparatus of the aforementioned type. The inspection is carried out by qualified inspectors under government supervision and is for the purpose of determining whether any carcass is diseased or contaminated and hence not useable for human consumption. According to current practice, trolley equipped gambrels are applied to the hind feet of the carcasses directly following the slaughtering and other preliminary conditioning operations. After application of the gambrels, the trolleys are successively mounted on an overhead rail which has associated with it power driven mechanism for moving the gambrel supported carcasses along the rail for treatment at different stations or locations. The inspection apparatus is located at one of the stations and is so operated and designed that the pans on the upper reaches of the chains move in synchronism with the carcasses and there is one pan adjacent each carcass. Before the carcasses reach the inspection apparatus, the bellies are slit open and the heads are partially or completely severed adjacent the cervical or neck regions. When each carcass reaches the apparatus, the viscera is removed and placed on the opposite pan of the apparatus for purposes of inspection. The cervical lymphatic glands in the heads of the carcasses are inspected to determine whether tuberculosis or other disease is present. In connection with inspection of the heads, the inspectors by way of suitable knives cut into the lymphatic glands. When the slaughtering is comparatively fast, it is generally the practice or custom to inspect the heads of the carcasses while they are but partially severed from the carcasses and at the same time to inspect the viscera on the pans of the apparatus. When the slaughtering is at a slow rate of speed, the heads of the carcasses as a preliminary to inspection are completely severed from the carcasses and are placed on the apparatus with their respective viscera so that they and the viscera may be inspected together instead of separately. In connection with inspection of the heads after full or complete severing from the carcasses and while on the inspection apparatus, it has been proposed to segregate each head from its respective viscera by placing the head on one pan and the viscera on the adjoining or next following pan. The purpose of segregating each head from its respective viscera is to prevent the head from contaminating the viscera or the viscera from contaminating the head. As evidenced by United States Patent No. 2,492,387, granted to me on December 27, 1949, it has heretofore been proposed in connection with an inspection apparatus of the type under consideration to have every other pan of large size for viscera holding purposes and the alternate pans of small size and provided with a fixed holder for head holding or retaining purposes. The disadvantage of an inspection apparatus of the last mentioned character is that it lends itself only to slow speed slaughtering operations where the heads are completely severed from the carcasses and are inspected while on the holder equipped small sized pans. In most packing houses, the slaughtering is at different rates of speed at different times and, therefore, an inspection apparatus like that of the aforementioned patent is not suitable to high speed slaughtering operations wherein the heads are inspected while partially severed from the carcasses and the viscera is inspected independently and while on the pans of the apparatus.

The primary object of the present invention is to provide an inspection apparatus in which the pans are all the same in size and every other pan is provided with a removable head holder. When the slaughtering operation is at a high rate of speed and the heads are inspected while partially severed from the carcasses, the head holders are removed in order that all of the pans are available for holding the viscera of the carcasses. When the slaughtering operation is at a low rate of speed, the head holders are placed on every other pan in order that each head to be inspected and its respective viscera may be placed on adjoining pans. By having the head holders so that they may be selectively applied to, or removed from, every other pan, the apparatus has in a measure universal capabilities of use insofar as it may be employed either in connection with a high speed slaughtering operation wherein the heads are inspected while partially severed from the carcasses or in connection with a low speed slaughtering operation wherein the heads are inspected on the apparatus while in associated relation with their respective viscera.

Another object of the invention is to provide an inspection apparatus of the last mentioned character in which the removable head holders are formed of wire and are so constructed and arranged they they serve when in use to hold the heads in a substantially upright position with the nose portions at the bottom and the skull portions at the top.

A further object of the invention is to provide a viscera and head inspection apparatus of the type and character under consideration in which the head holders are arranged and designed so that they are slidable horizontally into and out of connected relation with every other pan and each holder consists of: (1) a substantially circular, normally horizontal holder part which is designed to extend around the base of the nose portion of the head and is adapted when the holder is in its operative position with respect to a pan to be positioned a small distance above the central portion of the pan; (2) a pair of side arms which are located on opposite sides of the holder part, extend outwards in opposite directions, and have the inner ends thereof connected to the side portions of the holder part and their outer ends provided with hooks for engaging the central portions of outwardly extending flanges on the side walls of the rim of the pan; and (3) a rear arm which is connected to, and extends rearwards from, the rear portion of the holder part and is provided at its outer or rear end with an inverted U-shaped clip for attachment to the central portion of an outwardly extending flange on the rear wall of the rim of the pan.

A still further object of the invention is to provide a viscera and head inspection apparatus which is generally of new and improved construction, effectively and efficiently fulfills its intended purpose, and is capable of being produced at a comparatively low cost.

Other objects of the invention and the various advantages and characteristics of the present inspection apparatus will be apparent from a consideration of the following detailed description.

The invention consists in the several novel features which are hereinafter set forth and are more particularly defined by claims at the conclusion hereof.

In the drawings which accompany and form a part of this specification or disclosure and in which like numerals of reference denote corresponding parts throughout the several views:

Figure 1 is a side elevation of a viscera and head inspection apparatus embodying the invention;

Figure 2 is a plan view showing every other plan of the apparatus provided with a removable head holder;

Figure 3 is an enlarged plan view of one of the pans with a head holder applied thereto;

Figures 4 and 5 are, respectively, side and rear views of the holder equipped pan that is shown in Figure 3;

Figure 6 is an enlarged section taken on the line 6—6 of Figure 3 and illustrating in detail the construction and design of the inverted U-shaped clips on the outer ends of the rear arms of the holders;

Figure 7 is an enlarged section taken on the line 7—7 of Figure 3 and showing in detail the construction and design of the hooks at the outer ends of the side arms of the holders; and Figure 8 is a perspective of one of the inverted U-shaped clips.

The apparatus which is illustrated in the drawings constitutes the preferred form or embodiment of the invention and is for use in a commercial slaughtering or packing house. Its purpose is to retain the viscera or the viscera and heads of hog, sheep or calf carcasses in connection with governmental inspection thereof. As its principal components or parts the apparatus comprises a horizontally elongated frame structure 9, an endless conveyor 10, an endless or continuous series of pans and a plurality of removable head holders 11. It is contemplated that the apparatus will be placed at one side of, and in parallel relation with, a portion of an overhead rail along which carcasses to be inspected and processed are continuously moved by way of power driven mechanism which is associated with the rail. It is also contemplated that the bellies of the carcasses will be slit lengthwise and the heads of the carcasses will be either partially or fully severed from the carcasses directly before the carcasses reach the apparatus. As well understood in the art, trolley equipped gambrels are applied to the hind feet of the carcasses after the animals are slaughtered and treated in a preliminary manner. After application of the gambrels, the trolleys thereof are mounted on the aforementioned overhead rail and are propelled by the power driven mechanism continuously along the rail and past the apparatus. As viewed in Figures 1 and 2, the left hand end of the apparatus is the receiving end and the right hand end is the discharge end. The carcasses, the viscera and the heads of which are to be inspected, move left to right lengthwise of the apparatus.

The frame structure 9 of the apparatus is fabricated from heavy tubing and comprises a pair of similarly formed parallel, laterally spaced, frame-like sides. Each of the sides consists of a longitudinal series of uprights 12, a horizontally extending member 13 at the upper ends of the uprights and horizontally extending members 14 between the central portions of the uprights. The lower ends of the uprights 12 are provided with floor-engaging feet 15. The horizontally extending members 13 of the two sides of the frame structure are welded to the upper ends of the uprights and the ends of the horizontally extending members 14 are welded to the central portions of the uprights. Below the left hand ends of the horizontally extending members 13 are upper and lower horizontally extending bars 16 and these are spaced vertically apart and have the ends thereof welded to the upper portions of the adjacent uprights 12. Beneath the right hand ends of the horizontally extending members 13 are upper and lower horizontally extending bars 17 and these, like the bars 16, are spaced vertically apart and have the ends thereof welded to the upper portions of the adjacent uprights. The two sides of the horizontally elongated frame structure 9 are cross-connected by horizontally and transversely extending members 18. The latter have the ends thereof welded to certain of the uprights 12 and serve to hold the sides of the frame structure in fixed spaced apart relation. The frame structure 9, due to its construction, is rigid.

The endless conveyor 10 consists of a pair of parallel spaced apart endless roller chains 19 and these are located between, and extend lengthwise of, the upper portions of the sides of the frame structure and embody straight longitudinally extending, horizontal upper reaches and straight longitudinally extending, horizontal lower reaches. Each of the chains is of standard or conventional design and consists of a pair of laterally spaced links 20, horizontal pivot pins 21 between the ends of the links and rollers 22 on the central portions of the pivot pins. The left hand ends of the chains extend part way around, and are supported by, two spaced apart sprocket wheels 23 which are fixedly mounted on a horizontally extending shaft 24 at the receiving end of the frame structure. The ends of the shaft 24 are journaled in bearing blocks 25 and these extend between, and are fixedly secured to, the central portions of the upper and lower bars 16. An electric motor 26 and a speed reducing gear variety unit 27 serve to drive the chains 19 so that they move continuously in a clockwise direction as viewed in Figures 1 and 2 of the drawings. The motor 26 is connected to drive the drive shaft of the unit 27. The latter is suitably mounted on the left hand end of one of the sides of the frame structure and embodies a driven shaft (not shown) which is operatively connected to one end of the shaft 24 to which the sprocket wheels 23 are fixedly connected. The right hand ends of the chains 19 are trained part way around, and are supported by, a pair of laterally spaced sprocket wheels 28 and these are fixedly secured to a transversely extending horizontal shaft 29. The ends of the last mentioned shaft are journaled in bearing blocks 30 which fit slidably between the central portions of the upper and lower bars 17 and have applied thereto horizontal screw shafts 31 for sliding the bearing blocks 30 so as to take up slack in the endless roller chains 19. It is contemplated that the motor 26 and the speed reducing unit 27 will drive the conveyor 10 so that its speed corresponds to, or is the same as, the speed at which the carcasses are moved along the aforementioned overhead rail.

The pans are designated in the drawings by the reference numeral 32 and extend between, and are connected to, the chains 19 constituting the endless conveyor 10. They are substantially rectangular, extend transversely of the conveyor 10, and have continuous upstanding rims 33 at their margins. Preferably, the pans are formed of stainless steel. As will be described in more detail hereafter, each pan may be used individually to hold the viscera of an adjacent carcass or every other pan may be used to hold viscera and the alternate pans may be used to hold the heads belonging to their respective viscera. The upper margins of the rims 33 of the pans 32 are bent outwards, then downwards and then inwards to form rectangular outwardly extending double thick flanges 34. The central outer portions of the pans are connected to the chains 19 of the conveyor 10 by way of pairs of angle bar-type brackets 35. The latter consist of legs 36 and legs 37. The legs 36 are riveted, welded or otherwise fixedly secured to certain of the links 20 of the chains and the legs 37 extend at right angles to the legs 36 and are spot welded or otherwise fixedly secured to the outer central portions of the pans. It is contemplated that as soon as a carcass with a slit belly reaches the receiving end of the frame structure, the viscera will be removed from the carcass and placed on the pan that is on the upper reach of the conveyor and is directly opposite the carcass. If the slaughtering operation is comparatively fast and it is, therefore, necessary to inspect the heads while partially severed from the carcasses, the viscera after removal from the bellies of the carcasses will be placed on successive pans. On the other hand, if the slaughtering operation is slow and it is, therefore, possible to inspect the heads after complete severance from the carcasses, the heads will be placed at every other pan and their respective viscera will be placed on the adjoining pans. If it is found that any viscera or head is contaminated, the viscera or head is permitted to be discharged into a suitable receptacle (not shown) when the pan on which it is retained passes around the sprocket wheels 28 at the discharge end of the frame structure. If the viscera or head is not contaminated, it is removed from the pan as the latter reaches the discharge end of the frame structure and then placed on a separate table for further processing. As shown in the drawings, the pans 32 are arranged in closely spaced relation.

The removable head holders 11 correspond in number to half of the number of pans 32 and, when in use or operation, are applied to every other pan. They are formed of heavy wire in order that they are for all intents and purposes rigid while at the same time slightly resilient. Generally speaking, the holders are brought into play in connection with slow speed slaughtering when it is desired to inspect the heads with their respective viscera. Each holder comprises a substantially circular normally horizontal holder part 38, a pair of oppositely extending side arms 39 and a rearwardly extending rear arm 40. When the holders 11 are in their operative position, the holder parts 38 are disposed a small distance above the central portions of the pans 32. The holder parts are adapted to surround the bases of the nose portions of the heads and serve when in use to hold the heads in a substantially upright position with the nose portions at the bottom and the skull portions at the top (see dotted lines in Figure 4). The side arms 39 of the holders are L-shaped and consist of upwardly and outwardly extending inner parts 41 and horizontal outer parts 42. The upper ends of the inner parts 41 directly underlie, and are welded to, the side portions of the holder parts 38. The outer parts 42 of the holder side arms 39 are straight and when the holders are in use lie in substantially the same plane as the flanges 34 of the associated pans. The outer ends of the horizontal outer parts 42 are flattened and are bent first downwards and then inwards in order to form inwardly facing hooks 43 for gripping and engaging slidably the central portions of the side parts of the flanges 34 of the associated pans. The rear arms 40 of the holders are straight and extend rearwards and downwards from the rear portions of the holder parts. The inner or front ends of the rear arms 40 abut against, and are welded to, the rear portions of the holder parts 38. The outer or rear ends of the rear arms 40 are flattened and are bent so that they extend horizontally. The flattened rear ends of the rear arms are provided with inverted U-shaped clips 44 for application to the central portions of the rear parts of the flanges 34 of the associated pans. The clips are in the form of sheet metal stampings and consist of horizontal intermediate parts 45 and depending inner and outer side parts 46 and 47. The horizontal intermediate parts 45 underlie, and are welded to, the flattened rear ends of the rear arms 40 and are the same in width as the rear parts of the flanges 34 of the associated pans. The inner side parts 46 of the clips 44 are comparatively short and extend downwards at right angles to the intermediate parts 45. The outer side parts 47 of the clips 44 extend slightly inwards in order that when the clips are applied they snap into place and grip frictionally the subjacent portions of the flanges 34 of the associated pans. The lower ends of the outer side parts 47 are provided with outwardly extending extensions 48 which are adapted to be gripped by the fingers and pulled outwards in order outwardly to flex the outer side parts 47 in connection with removal of the clips from the subjacent portions of the flanges 34 of the associated pans. In connection with application of the clips, the clips are forced downwards. In connection with initial downward pressing of the clips, the extensions 48 slide on the outer edges of the subjacent portions of the flanges 34 of the associated pans and cause the outer side parts 47 to flex outwards so that in connection with final downward pressing of the clips, the inner and outer side parts 46 and 47 are brought into straddled relation with the subjacent portions of the flanges 34. As soon as the clips are pressed downwards to their fullest extent, the outer side parts 47 flex inwards and thus result in the clips being maintained in firm gripping or clamping relation with the subjacent portions of the flanges 34.

When it is desired to use the holders 11, the holders are first positioned rearwards of the pans and are then manipulated so as to bring the hooks 43 into alignment with the rear end portions of the side parts of the flanges 34 of the associated pans. Thereafter, the holders are slid forwards until the hooks extend around the central portions of the side parts of the flanges and the clips 44 overlie the central portions of the rear parts of the flanges. After this operation, the clips are pressed downwards so as to bring them into gripping relation with the subjacent portions of the flanges 34. When it is desired to remove the head holders 11, the extensions 48 on the lower ends of the side parts 47 of the clips 44 are gripped and then swung outwards and upwards in order to release or remove the clips from the subjacent portions of the flanges 34. Thereafter, the holders are slid rearwards until they are free from the associated pans. As heretofore pointed out, the holders are brought into play in connection with a slow speed slaughtering operation when it is desired that the heads after complete severing from the carcasses be inspected in side-by-side relation with their respective viscera. In connection with a high speed slaughtering operation, the holders are removed in order that all of the pans 32 are available for the holding of viscera only.

The herein described inspection apparatus, due to the fact that it includes the removable head holders 11, may be employed either in connection with a high speed slaughtering operation wherein the heads are inspected while partially severed from the carcasses or in connection with a low speed slaughtering operation wherein the heads are inspected on the apparatus while in associated relation with their respective viscera. By reason of the fact that the head holders 11 are simple in design, the inspection apparatus as a whole is capable of being produced at a comparatively low cost. Because of the particular construction and design of the holders, the latter may be applied to, and removed from, every other pan with facility.

The invention is not to be understood as restricted to the details set forth since these may be modified within the scope of the appended claims without departing from the spirit and scope of the invention.

Having thus described the invention what I claim as new and desire to secure by Letters Patent is:

1. In an apparatus of the type that is adapted for use in connection with inspection of the viscera and heads of animal carcasses and comprises a horizontally elongated frame structure, an endless conveyor mounted on the frame structure, arranged so that it has a longitudinally extending horizontal upper reach, and provided with power means for driving it in one direction, and a series of side-by-side rectangular pans of similar size extending around, and connected to, the conveyor and provided with continuous rims with outwardly extending flanges on their outer margins, every other pan being adapted when traveling on the upper reach of the conveyor individually to retain the viscera of certain of the carcasses and the alternate pans being adapted when traveling on the upper reach of the conveyor either individually to retain the viscera of other carcasses or individually to retain the heads belonging to the viscera on the adjoining pans; head holders corresponding in number to, and associated respectively with, the alternate pans, provided with means for removably connecting them to the flanges on the rims of said alternate pans, and embodying substantially circular and centrally disposed holder parts adapted when the head holders are connected to the alternate pans to encircle the bases of the nose portions of the heads belonging to the viscera on the adjoining pans and hold said heads in an upright or vertical inspection position with the nose portions down and the skull portions up, said head holders being adapted when removed from said alternate pans to permit the latter to retain the viscera of the other carcasses.

2. In an apparatus of the type that is designed for use in connection with inspection of the viscera of animal carcasses and comprises a horizontally elongated frame structure, an endless conveyor mounted on the frame structure, arranged so that it has a longitudinally extending horizontal upper reach, and provided with power means for driving it in one direction, and a series of side-by-side rectangular pans extending around, and connected to, the conveyor and provided with continuous rims with outwardly extending flanges on their outer margins, every other pan being adapted when traveling on the upper reach of the conveyor individually to retain the viscera from certain of the carcasses and the alternate pans being adapted when traveling on the upper reach of the conveyor either individually to retain the viscera of other carcasses or individually to retain the heads belonging to the viscera on the adjoining pans; removable head holders corresponding in number to, and associated respectively with, the alternate pans, adapted when in use with the alternate pans to hold the heads belonging to the viscera on the adjoining pans in a substantially upright or vertical position with the nose portions down and the skull portions up, and further adapted when removed from the alternate pans to permit the latter to retain the viscera of the other carcasses, said holders comprising substantially circular holder parts adapted when the holders are in use to encircle the bases of the nose portions of the heads and to be positioned a small distance above the central portions of the alternate pans, side arms connected to, and extending outwards in opposite directions from, the side portions of the holder parts and provided at their outer ends with inwardly facing hooks for slidably engaging the central portions of the side parts of the flanges on the rims of the alternate pans, and rear arms connected to, and projecting rearwards from, the rear portions of the holder parts and provided at their outer ends with releasable means for attachment to the central portions of the rear parts of the flanges on the rims of said alternate pans.

3. In an apparatus of the type that is designed for use in connection with inspection of the viscera and heads of animal carcasses and comprises a horizontally elongated frame structure, an endless conveyor mounted on the frame structure, arranged so that it has a longitudinally extending horizontal upper reach, and provided with power means for driving it in one direction, and a series of side-by-side rectangular pans of similar size extending around, and connected to, the conveyor and provided with continuous rims with outwardly extending flanges on their outer margins, every other pan being adapted when traveling on the upper reach of the conveyor individually to retain the viscera from certain of the carcasses and the alternate pans being adapted when traveling on the upper reach of the conveyor either individually to retain the viscera of other carcasses or individually to retain the heads belonging to the viscera on the adjoining pans; removable head holders corresponding in number to, and associated respectively with, the alternate pans, adapted when in use with the alternate pans to hold the heads belonging to the viscera on the adjoining pans in a substantially upright or vertical position with the nose portions down and the skull portions up, and further adapted when removed from the alternate pans to permit the latter to retain the viscera of the other carcasses, said holders being formed of comparatively stiff wire and comprising substantially circular holder parts adapted when the holders are in use to encircle the bases of the nose portions of the heads and to be positioned a small distance above the central portions of the alternate pans, side arms connected to, and extending outwards in opposite directions from, the side portions of the holder parts and provided at their outer ends with inwardly facing hooks for slidably engaging the central portions of the side parts of the flanges on the rims of the alternate pans, and rear arms connected to, and projecting rearwards from, the rear portions of the holder parts and provided at their outer ends with inverted U-shaped clips for releasably gripping the central portions of the rear parts of the flanges on the rims of said alternate pans.

4. In an apparatus of the type that is designed for use in connection with inspection of the viscera and heads of animal carcasses and comprises a horizontally elongated frame structure, an endless conveyor mounted on the frame structure, arranged so that it has a longitudinally extending horizontal upper reach, and provided with power means for driving it in one direction, and a series of side-by-side rectangular pans extending around, and connected to, the conveyor and provided with continuous rims with outwardly extending flanges on their outer margins, every other pan being adapted when traveling on the upper reach of the conveyor individually to retain the viscera from certain of the carcasses and the alternate pans being adapted when traveling on the upper reach of the conveyor either individually to retain the viscera of other carcasses or individually to retain the heads belonging to the viscera on the adjoining pans; removable head holders corresponding in number to, and associated respectively with, the alternate pans, adapted when in use with the alternate pans to hold the heads belonging to the viscera on the adjoining pans in a substantially upright or vertical position with the nose portions down and the skull portions up, and further adapted when removed from the alternate pans to permit the latter to retain the viscera of the other carcasses, said holders being formed of comparatively stiff material and comprising substantially circular holder parts adapted when the holders are in use to encircle the bases of the nose portions of the heads and to be positioned a small distance above the central portions of the alternate pans, L-shaped side arms extending outwards in opposite directions from the side portions of the holder parts, consisting of upwardly extending inner parts and longitudinal outer parts, having the upper ends of their inner parts connected to the side portions of the holder parts and having the outer ends of the outer parts thereof provided with inwardly facing hooks for slidably engaging the central portions of the side parts of the flanges on the rims of the alternate pans, and rear arms connected to, and projecting rearwards from, the rear portions of the holder parts and provided at their outer ends with releasable means for attachment to the central portions of the rear parts of the flanges of the rims of said alternate pans.

5. In an apparatus of the type that is designed for use in connection with inspection of the viscera and heads of animal carcasses and comprises a horizontally elongated frame structure, an endless conveyor mounted on the frame structure, arranged so that it has a longitudinally extending horizontal upper reach, and provided with power means for driving it in one direction, and a series of side-by-side rectangular pans of similar size extending around, and connected to, the conveyor and provided with continuous rims with outwardly extending flanges on their outer margins, every other pan being adapted when traveling on the upper reach of the conveyor individually to retain the viscera from certain of the carcasses and the alternate pans being adapted when traveling on the upper reach of the conveyor either individually to retain the viscera of other carcasses or individually to retain the heads belonging to the viscera on the adjoining pans; removable head holders corresponding in number to, and associated respectively with, the alternate pans, adapted when in use with the alternate pans to hold the heads belonging to the viscera on the adjoining pans in a substantially upright or vertical position with the nose portions down and the skull portions up, and further adapted when removed from the alternate pans to permit the latter to retain the viscera of the other carcasses, said holders being formed of comparatively stiff wire and comprising substantially circular holder parts adapted when the holders are in use to encircle the nose portions of the heads and to be positioned a small distance above the central portions of the alternate pans, L-shaped side arms extending outwards in opposite directions from the side portions of the holder parts, consisting of upwardly and outwardly extending inner parts and horizontal outer parts, having the upper ends of their inner parts welded to the side portions of the holder parts and having the outer ends of their outer parts flattened and bent downwards and inwards to form inwardly facing hooks for slidably engaging the central portions of the side parts of the flanges on the rims of the alternate pans, and rear arms projecting rearwards and downwards from the rear portions of the holder parts, having the inner ends thereof welded to said rear portions of the holder parts, and provided at their outer ends with inverted U-shaped clips for releasably gripping the central portions of the rear parts of the flanges of the rims of said alternate pans.

References Cited in the file of this patent

UNITED STATES PATENTS

| | | | |
|---|---|---|---|
| Re. 16,079 | Lundell | | May 19, 1925 |
| 759,435 | Greeley | | May 10, 1904 |
| 1,819,877 | Dumas | | Aug. 18, 1931 |
| 2,492,387 | Lundell | | Dec. 27, 1949 |